Patented Aug. 1, 1933

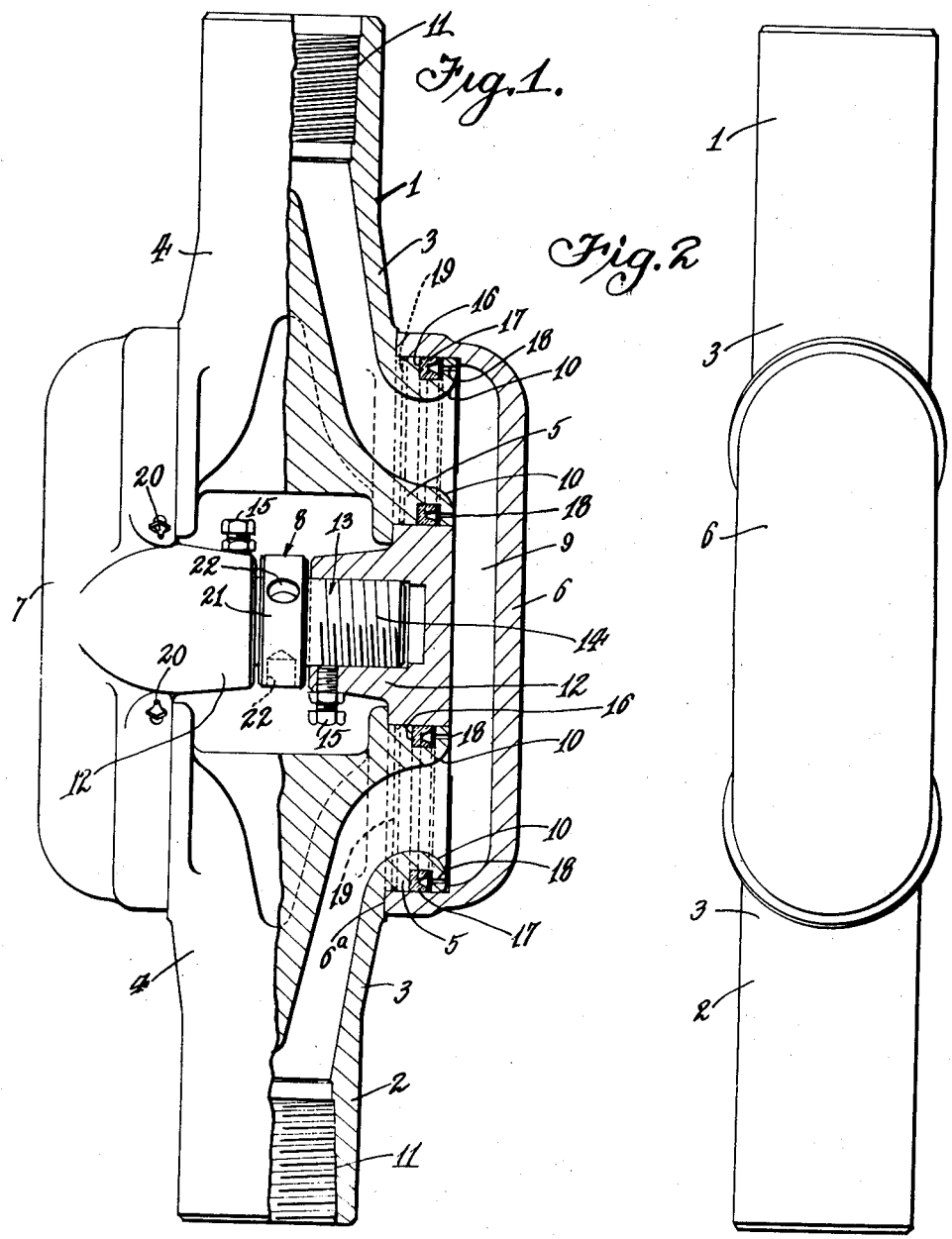

1,920,658

UNITED STATES PATENT OFFICE 1,920,658

PRESSURE PACKED SWING JOINT

Demery Ambrose Murphy, Torrance, and Arthur Judson Hodge, Lomita, Calif., assignors to The National Supply Company, Toledo, Ohio, a Corporation of Ohio Application December 12, 1930. Serial No. 501,866

5 Claims. (Cl. 285—18)

This invention relates to pressure packed swing joints, and more particularly to a pressure packed swing joint adapted for use in a steel hose for the purpose of providing a swinging coupling in such steel hose.

An object of this invention is to provide a pressure packed swing joint which is so designed as to provide no obstruction to the passage of the fluid therethrough and which is so packed that the fluid under pressure in passing through the swing joint does not so act upon the packing means to produce friction to hinder the movement of the joint.

Another object of this invention is to provide a pressure packed swing joint for use in a fluid pressure hose which is provided with self-sealing packing so constructed and positioned as to permit the fluid under pressure passing through the swing joint to spread the packing of the swing joint and thereby afford a fluid-tight seal.

Another object of this invention is to provide a swing joint for use in connection with steel or like hoses which includes two like coupling members coupled together by means of right and left-hand heads secured together by means of a jack.

Other objects and advantages of this invention it is believed will be apparent from the following detailed description of a preferred embodiment thereof as illustrated in the accompanying drawing:

In the drawing:

Figure 1 is a side elevation half in vertical midsection of the pressure packed swing joint embodying our invention.

Figure 2 is a side elevation thereof.

In the preferred embodiment of our invention illustrated in the accompanying drawing, 1 and 2 indicate coupling members which are of like construction. Coupling members 1 and 2 are formed to provide a pair of diverging branches 3 and 4 through which passages are formed. The branches 3 and 4 terminate in trunnions 5 which form the pivots on which the coupling members 1 and 2 swing.

Right and left-hand connecting caps 6 and 7 are fitted over the trunnions 5 and are secured together by means of an intermediate jack 8 positioned between the ends of the coupling members 1 and 2. The heads 6 and 7 are of the same construction, and it is believed only necessary to describe the construction of the head 6. The head 6 is provided at its ends with openings into which the trunnions 5 are fitted. The inner edges of the head 6 fit against the annular seat 6a formed around the trunnions 5 and the branches 3 and 4 of the coupling members 1 and 2 respectively.

Formed through the head 6 in position to communicate with the passages formed through the branches 3 of the coupling members 1 and 2 is a fluid passage 9. The fluid passage 9 is unobstructed throughout its length and the passages formed through the branches 3 and 4 of the coupling members 1 and 2 are belled outwardly as indicated at 10 so that an unobstructed fluid passage is formed between the coupling members 1 and 2.

The coupling members 1 and 2 are threaded as indicated at 11 for the reception of a similarly threaded member secured to the end of the hose in which the swing member embodying my invention is mounted.

The intermediate jack sections 12 of the heads 6 and 7 are secured together by means of the jack 8 so as to clamp the heads 6 and 7 firmly to the coupling members 1 and 2. The jack 8 includes a jack screw 13 which is threaded with threads 14 at its opposite ends. The threads 14 formed at the opposite ends of the jack screw 13 are of opposite direction of rotation. The threads on the right-hand end are preferably right-hand threads, and the threads on the left-hand end are left-hand threads, so that as the jack screw 13 is turned toward the right, the two heads 6 and 7 are drawn together. The jack screw 13 is threaded into the intermediate jack screw sections 12 of the heads 6 and 7 and is locked in position by means of lock screws 15 threaded into the jack screw sections 12 in position to engage the jack screw 13.

Means are provided for packing the swing joint so that friction is not developed sufficiently to hinder the free swinging of the coupling members 1 and 2 on the trunnions 5 thereof. In each of the trunnions 5 there is formed an annular packing groove 16 within which packing 17 is mounted.

The packing 17, as herein illustrated, is of the cup type which is expanded by fluid pressure admitted to within the cup of packing by means of a series of fluid ports 18 formed in the end of the trunnions 5 in communication with the passage 9 of the heads 6 and 7 at one end and opening into the packing recesses 16 at their opposite end. In this manner the fluid under pressure which is passing through the swing joint expands the packing 17 outwardly to form a fluid-tight joint, developing as little as possible friction tending to hinder the free rotation of the coupling members 1 and 2 on the trunnions 5.

In order to lubricate the pivots formed by the trunnions 5 so as to permit their free rotation within the heads 6 and 7, grease grooves 19 are formed around the trunnions 5 and are fed with grease through grease fittings 20 secured to the heads 6 and 7 respectively in position to register with the grease grooves 19. By means of the fittings 20 the grease under pressure from any suitable form of grease apparatus is forced into the grease groove 19 to maintain the same filled and to maintain the trunnions 5 properly lubricated.

In order to permit rotation of the jack screw 13, the same is provided with a rotation nut 21 between the jack screw sections 12 of the heads 6 and 7 and the head 21 is provided around its periphery with wrench holes 22 in which any suitable form of rod may be fitted for turning the jack screw 13.

Having fully described our invention, it is to be understood that we do not wish to be limited to the details herein set forth, but our invention is of the full scope of the appended claims.

I claim:

1. In a pressure packed swing joint, the combination of a pair of similar coupling members having diverging fluid passages formed therein, and a pair of transverse trunnions formed at their ends through which said diverging fluid passages extend, a pair of heads adapted to connect the trunnions of said coupling members so as to permit relative pivotal movement of said trunnion members, the heads having fluid passages therein connecting the divergent fluid passages of the coupling members on opposite sides of the swing joint, jack receiving sockets terminating short of said passages in the opposed faces of said heads and a jack engaging said sockets for drawing said head members together over their respective trunnions.

2. In a pressure packed swing joint, the combination of a pair of coupling members having divergent branches terminating in trunnions, heads fitted to the trunnions on the opposite sides of the swing joint permitting relative pivotal movement of the coupling members around said trunnions, packing means carried by the trunnions for packing the trunnions to said heads, the heads being provided with fluid passages therethrough connecting the branches of the coupling members, jack screw receiving sockets terminating short of said passages in the opposed faces of said heads and a jack screw threaded in said sockets, and means for venting the packing means into fluid under pressure in said heads for expanding said packing outwardly under the fluid pressure in said heads.

3. In a device of the class described, the combination of a pair of similar coupling members having divergent branches terminating in trunnions, the axes of which are at right angles to the center line of said coupling members, heads adapted to be fitted over said trunnions on opposite sides of the devices, the heads being provided between the ends of said coupling members with intermediate threaded jack sections, a jack screw threaded into said threaded jack sections at its opposite ends for drawing said head members together over said trunnions, and means for packing the trunnions to said head members.

4. In a device of the class described, the combination of a pair of similar coupling members having divergent branches terminating in trunnions, the axes of which are at right angles to the center line of said coupling members, heads adapted to be fitted over said trunnions on opposite sides of the devices, the heads being provided between the ends of said coupling members with intermediate threaded jack sections, a jack screw threaded into said threaded jack sections at its opposite ends for drawing said head members together over said trunnions, means for packing the trunnions to said head members and the trunnions having annular grease grooves formed therein, and means secured to said heads for supplying grease to the grease grooves.

5. In a device of the class described, the combination of a pair of similar coupling members having divergent fluid passages terminating in trunnions, the axes of which are at right angles to the center line of said coupling members, heads fitted over the trunnion members on the opposite sides of said device, packing means provided between the trunnions and the head members, the head members being provided with intermediate jack sections between the ends of said coupling members, a jack screw threaded into the intermediate jack sections of said heads for drawing the said heads together over the trunnions, and lock means secured to the intermediate jack sections for locking the jack screw in adjusted position.

DEMERY AMBROSE MURPHY.
ARTHUR JUDSON HODGE.